United States Patent [19]
Sobajima et al.

[11] Patent Number: 5,990,220
[45] Date of Patent: Nov. 23, 1999

[54] PROPYLENE RESIN COMPOSITION AND COATING METHOD USING THE SAME

[75] Inventors: Yoshihiro Sobajima; Hironari Fujii; Masashi Shimouse, all of Mie, Japan

[73] Assignee: Japan Polychem Corporation, Tokyo, Japan

[21] Appl. No.: 08/796,135

[22] Filed: Feb. 6, 1997

[30] Foreign Application Priority Data

Feb. 7, 1996 [JP] Japan ..................................... 8-021430

[51] Int. Cl.$^6$ .............................. C08L 51/06; C08K 3/34
[52] U.S. Cl. ........................... 524/449; 524/451; 525/70; 525/71; 525/87
[58] Field of Search ................. 525/70, 71, 87; 524/451, 449

[56] References Cited

U.S. PATENT DOCUMENTS

| | | | |
|---|---|---|---|
| 5,354,618 | 10/1994 | Ishigaki et al. | 525/78 |
| 5,462,987 | 10/1995 | Shinonaga et al. | 525/71 |
| 5,556,910 | 9/1996 | Harada et al. | 525/71 |
| 5,585,187 | 12/1996 | Shinonaga et al. | 525/71 |

FOREIGN PATENT DOCUMENTS

| | | |
|---|---|---|
| 2572417 | 5/1986 | France . |
| 7-118488 | 5/1995 | Japan . |

OTHER PUBLICATIONS

Database WPI, Derwent Publications, AN–97–128932, JP–A–9–012832, Jan. 14, 1997.
Database WPI, Derwent Publications, AN–96–157216, JP–8–041276, Feb. 13, 1996.
Database WPI, Derwent Publications, AN–96–157214, JP–8–041274, Feb. 13, 1996.
Database WPI, Derwent Publications, AN–95–204006, JP–7–118488, May 9, 1995.

*Primary Examiner*—Donald R. Wilson
*Attorney, Agent, or Firm*—Oblon, Spivak, McClelland, Maier & Neustadt, P.C.

[57] ABSTRACT

A propylene resin composition having suitability to coating is disclosed which comprises (a) 100 parts by weight of a propylene-ethylene block copolymer comprising 60 to 95% by weight of a crystalline polypropylene unit and 5 to 40% by weight of an ethylene-propylene random copolymer unit, (b) 2 to 120 parts by weight of an ethylene-α-olefin copolymer obtained by polymerization using a metallocene catalyst, containing 20 to 65% by weight of an α-olefin having 3 to 8 carbon atoms, and having a melt flow rate of 0.5 to 40 g/10 min and a density of 0.85 to 0.90 g/cm$^3$, (c) 0.1 to 120 parts by weight of a filler selected from talc, mica, and a fibrous filler, (d) 5 to 40% by weight of a propylene polymer having grafted thereto 0.1 to 25% by weight, based on the total polymer, of maleic anhydride or a hydroxyl-containing maleic anhydride derivative, and (e) 0 to 10% by weight of a hydroxyl-terminated diene polymer or a hydrogenation product thereof. A molded article obtained from the propylene resin composition can be coated with a melamine coating without cleaning with trichloroethane or primer coating to provide a coated article having high adhesion to the coating, appearance, and well-balanced high mechanical strength.

2 Claims, No Drawings

PROPYLENE RESIN COMPOSITION AND COATING METHOD USING THE SAME

FIELD OF THE INVENTION

This invention relates to a propylene resin composition having excellent suitability to coating. More particularly, it relates to a propylene resin composition providing a molded article which has a satisfactory appearance (as non-coated) and well-balanced high mechanical strength (i.e., rigidity and impact strength) and exhibits sufficient adhesion even to a melamine coating that is generally accepted as being difficult to apply to propylene resin molded articles without requiring any special solvent pretreatment or primer coating. The propylene resin composition of this invention is therefore suitable for use as a material of various industrial parts.

BACKGROUND OF THE INVENTION

Propylene resin materials as various industrial parts are usually subjected to practical use as coated at least partly. However, because propylene resins have no polar group in their own structure, it is difficult to apply a coating directly thereon to obtain a sufficient coating adhesion for practical use. Improvement on adhesion of the molded article to a coating has been made in most cases by cleaning the surface of the molded article with trichloroethane (TCE) followed by primer coating or a plasma treatment.

However, these conventional coating methods have their several problems. That is, the use of TCE cleaning agent has been prohibited since 1995 by the Montreal protocol from consideration of global environmental conservation. Primer coating is costly because of expensiveness of a primer itself and also the increase in coating steps. Besides, the solvent in the primer must be evaporated, which involves a danger of fire.

The plasma treatment requires installment of expensive equipment for creating a high degree of vacuum and should be carried out in a batch system, which unavoidably increases the coating cost. Further, in recent years molded articles of complicated shape have been demanded. It is difficult to give a uniform plasma treatment to all the surfaces of an article having a complicated shape. Furthermore, if a plasma-treated surface is contacted with foreign matter, the adhesion of coating reduces, which may result in unevenness of coating performance. Therefore, considerable care should be taken in handling a plasma-treated article.

Omission of the cleaning treatment with TCE, primer coating and plasma treatment that have hitherto been required in coating propylene resin molded articles could lead to simplification of coating steps, improvement on the working environment, and reduction of cost. Many studies have so far been made in an attempt to omit these steps.

For example, a resin composition containing hydroxyl-modified polypropylene (JP-B-5-64660, the term "JP-B" as used herein means an "examined published Japanese patent application"), a resin composition containing unsaturated carboxylic acid-grafted polypropylene (JP-A-5-59231, the term "JP-A" as used herein means an "unexamined published Japanese patent application"), a resin composition containing a diene polymer, EPR, and maleic anhydride-modified polypropylene (JP-A-7-118488), and a resin composition containing a hydroxyl-containing hydrogenated copolymer and an elastomer (JP-A-7-149971) have been proposed to date.

However, when coated directly with a coating, molded articles of these resin compositions do not always have sufficient adhesion to the coating. In particular, where well-balanced high mechanical performance, especially high rigidity combined with high impact strength, is required of a molded article, either a TCE treatment or primer coating is virtually essential in order to obtain practically acceptable adhesive strength of coating.

Above all, when a melamine coating is used, it has been difficult to secure all of sufficient coating adhesion for practical use, satisfactory appearance, and well-balanced high mechanical strength (i.e., high rigidity and low-temperature impact strength).

The inventors of the present invention have previously proposed a propylene resin composition containing a filler, a specific elastomeric component, and a modified propylene polymer as disclosed in Japanese Patent Application No. Hei 6-178944 (corresponding to JP-A-8-041276). In this proposal, they have succeeded in achieving practically sufficient adhesion to coating and yet securing excellent physical properties in good balance with processability even when a melamine coating which generally exhibits poor adhesion is applied and baked at 140° C., which is relatively lower than usually employed for baking, i.e., under a more strict condition.

There has been a tendency to reduce the thickness of a coating film provided on a molded article as well as the thickness of the molded article itself from the today's demand for cost reduction. To cope with this tendency, an improvement in adhesion to coating has been demanded. Because not a few molded articles are coated partially, an improvement in appearance (i.e., reduction of flow marks) of a molded article as molded or non-coated has also been demanded.

SUMMARY OF THE INVENTION

The inventors have conducted extensive study in order to achieve improvements on a propylene resin composition in adhesion to coating and appearance as molded. As a result, they have found that a molded article obtained from a specific propylene resin composition exhibits practically sufficient adhesion to coating even when coated directly and relatively thinly with a melamine coating followed by baking, and has a satisfactory appearance and well-balanced high mechanical strength. The present invention has been completed based on this finding.

The present invention provides a propylene resin composition suited to coating which comprises the components of:

(a) 100 parts by weight of a propylene-ethylene block copolymer comprising 60 to 95% by weight of a crystalline polypropylene unit (unit A) and 5 to 40% by weight of an ethylene-propylene random copolymer unit (unit B);

(b) 2 to 120 parts by weight of an ethylene-α-olefin copolymer obtained by polymerization in the presence of a metallocene catalyst, containing 20 to 65% by weight of an α-olefin having 3 to 8 carbon atoms and having a melt flow rate (230° C., 2.16 kg-load) of 0.5 to 40 g/10 min and a density of 0.85 to 0.90 g/cm³;

(c) 0.1 to 120 parts by weight of at least one filler selected from talc having a total length virtually of not greater than 15 μm, an average particle size of 1.5 to 6 μm, and an average aspect ratio of not less than 5, mica having an average particle size of 8 to 100 μm and an average aspect ratio of not less than 10, and a fibrous filler having an average diameter of not greater than 13 μm and an average aspect ratio of not less than 5;

(d) 5 to 40 parts by weight of a modified propylene polymer having a number average molecular weight of 4,000 to 13,000 which is obtained by modifying a propylene polymer by grafting a hydroxyl-containing maleic anhydride derivative represented by formula (I) in an amount of 5 to 20% by weight based on the total compound (d):

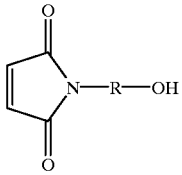

(I)

wherein R represents an alkylene group having 1 to 4 carbon atoms; and (e) 0 to 10% by weight of a hydroxyl-terminated diene polymer or a hydrogenation product thereof.

DETAILED DESCRIPTION OF THE INVENTION

The propylene-ethylene block copolymer as component (a) is a propylene-ethylene block copolymer comprising a crystalline polypropylene unit (hereinafter referred to as unit A) and an ethylene-propylene random copolymer unit (hereinafter referred to as unit B). The unit A is obtained by homopolymerization of propylene, and the unit B is obtained by random copolymerization of propylene and ethylene.

From the standpoint of thermal rigidity, it is preferable that the unit A forms a proportion of 60 to 95% by weight, particularly 70 to 95% by weight, in the propylene-ethylene block copolymer. Further, from the standpoint of thermal rigidity, it is preferable that the unit A has a density of not lower than 0.9070 g/cm³, particularly 0.9086 g/cm³ or higher.

From the standpoint of adhesion to coating and impact resistance, it is preferable that the unit B forms a proportion of 5 to 40% by weight, particularly 5 to 30% by weight, in the propylene-ethylene block copolymer and has an ethylene content of 20 to 80% by weight, particularly 25 to 50% by weight.

While the component (a) may be a single polymeric substance, it is preferable for enhancing the improvement in suitability to coating, impact strength, and appearance of a molded article that the component (a) be a mixture composed of: a propylene-ethylene block copolymer ($a^1$) containing 15 to 40% by weight, particularly 15 to 35% by weight, of the unit B having a weight average molecular weight of 200,000 to 400,000; and a propylene-ethylene block copolymer ($a^2$) containing 5 to 10% by weight, particularly 5 to 9% by weight, of the unit B having a weight average molecular weight exceeding 400,000 at an $a^1$:$a^2$ weight ratio of 5:95 to 95:5, particularly 20:80 to 80:20.

The total propylene-ethylene block copolymer preferably has a melt flow rate,(MFR; 230° C., 2.16 kg-load) of 10 to 100 g/10 min, particularly 20 to 100 g/10 min.

The proportion of the unit B in the propylene-ethylene block copolymer as referred to above is obtained by immersing 2 g of a sample polymer in 300 g of boiling xylene for 20 minutes to dissolve, cooling the solution to room temperature, collecting the precipitated solid by filtration through a glass filter, drying and weighing the solid, and calculating backward from the weight of the solid.

The weight average molecular weight (Mw) of the unit B as referred to above is obtained by concentrating the filtrate obtained above (xylene solution) and subjecting the concentrate to gel-permeation chromatography (GPC). The ethylene content is measured by infrared absorption spectrum method. The MFR is measured in accordance with JIS-K7210 (230° C., 2.16 kg-load).

The propylene-ethylene block copolymer as component (a) is prepared by slurry polymerization, vapor phase polymerization or liquid phase bulk polymerization using a catalyst for highly stereospecific polymerization vapor phase polymerization is rather suitable for preparing the one having a large content of the unit B. The polymerization for preparing the component (a) can be carried out either batchwise or continuously.

In the polymerization of the component (a), while either unit may be produced at first, it is recommended from quality consideration that homopolymerization of propylene to form the crystalline polypropylene unit (unit A) precedes random copolymerization of propylene and ethylene to form an ethylene-propylene random copolymer unit (unit B).

In some detail, propylene is homopolymerized in the presence of a catalyst system comprising (i) a solid component formed by contacting magnesium chloride with titanium tetrachloride, an organic acid halide and an organo-silicon compound and (ii) an organoaluminum compound, and then propylene and ethylene are random copolymerized.

As long as the effects of the invention are not ruined, the propylene-ethylene block copolymer may further comprise other unsaturated compounds, such as α-olefins (e.g., butene-1) and vinyl esters (e.g., vinyl acetate) to form a copolymer of termpolyer or more, or may be a mixture of these copolymers.

Each component of the component (a) and components (b) to (e) is compounded based on 100 parts by weight of the propylene-ethylene block copolymer (the component (a)). The compounding ratio of the compounds (b) to (e) will be described below.

The ethylene-α-olefin copolymer as the component (b) comprises 20 to 65% by weight, preferably 20 to 60% by weight, still preferably 20 to 55% by weight, of an α-olefin containing 3 to 8, preferably 4 to 8, still preferably 6 to 8, carbon atoms and has an MFR of 0.5 to 40 g/10 min. For improvement in appearance of a molded article, a preferred MFR is 0.8 to 40 g/10 min, particularly 1 to 40 g/10 min. The ethylene-α-olefin copolymer has a density of 0.85 to 0.90 g/cm³, preferably 0.85 to 0.89 g/cm³, particularly 0.85 to 0.88 g/cm³.

The ethylene-α-olefin copolymer preferably has a ethylene triad sequence of 55 to 70% as measured by $^{13}$C-NMR. The terminology "ethylene triad sequence" as used herein denotes the proportion of a chain of 6 methylene groups in all the alkyl groups having 6 carbon atoms.

The α-olefin in component (b) includes propylene, 1-butene, 1-pentene, 1-hexene, 1-heptene and 1-octene. Preferred of them are 1-butene, 1-pentene, 1-hexene, 1-heptene, and 1-octene. 1-Hexene and 1-octene are particularly preferred.

The ethylene-α-olefin copolymer can be prepared by, for example, vapor phase polymerization, solution polymerization, slurry polymerization or high-pressure polymerization. The ethylene-α-olefin copolymer may contain a small proportion of a diene component, such as dicyclopentacliene or ethylidenenorbornene.

The polymerization should be carried out in the presence of a catalyst called "metallocene catalyst". The metallocene catalyst does not always need to contain alumoxane but a combination of a metallocene compound and alumoxane, so-called Kaminsky catalyst, is preferred. Examples of useful Kaminsky catalysts are described in JP-A-58-19309, JP-A-59-95292, JP-A-60-35005, JP-A-60-35006, JP-A-60-35007, JP-A-60-35008, JP-A-60-35009, JP-A-3-163088, EP 420436, and U.S. Pat. No. 5,055,428. Those described in WO 91/04257 are particularly preferred.

If the α-olefin content in the component (b) is less than 20% by weight, the resin composition exhibits poor impact strength and poor suitability to coating. If the α-olefin content exceeds 65% by weight, the resin composition has reduced rigidity, and the resulting copolymer is difficult to keep in the form of pellets, which considerably reduces productivity in preparing the resin composition.

If the MFR of the component (b) is lower than 0.5 g/10 min, the resulting resin composition has poor suitability to coating. If it exceeds 40 g/10 min, the resin composition has poor impact strength. If the density of component (b) is lower than 0.85 g/cm$^3$, the copolymer is difficult to pelletize. If it exceeds 0.90 g/cm$^3$, the resulting resin composition has poor suitability to coating and insufficient impact strength.

The α-olefin content of the ethylene-α-olefin copolymer is measured in a conventional manner, such as infrared absorption spectrum method or $^{13}$C-NMR analysis. There is a tendency that the α-olefin content measured value obtained by infrared absorption spectrum method becomes smaller than that obtained by $^{13}$C-NMR analysis as the density of the copolymer reduces to, for example, about 0.88 g/cm$^3$ or lower in the case of 1-octene.

The MFR and density of the ethylene-α-olefin copolymer are measured in accordance with JIS-K7210 and JIS-K7112, respectively. The melt flow rate is measured at 230° C. and a load of 2.16 kg. The ethylene triad sequence can be obtained from the areal intensity of $^{13}$C-NMR signals in accordance with the description of *Nippon Gomu Kyokaishi*, Vol. 60, No. 1, p. 38 (1987).

The component (b) is used in a proportion of 2 to 120 parts by weight, preferably 5 to 120 parts by weight, particularly 10 to 100 parts by weight, per 100 parts by weight of the component (a). If the proportion of the component (b) is smaller than the above range, the resulting resin composition is insufficient in impact strength and suitability to coating. If it is larger than the above range, the resin composition is inferior in mechanical strength balance and appearance of a molded article thereof and is of no practical use.

The filler as the component (c) is at least one member selected from talc having a total length virtually of not greater than 15 μm, an average particle size of 1.5 to 6 μm, and an average aspect ratio of not less than 5, mica having an average particle size of 8 to 100 μm and an average aspect ratio of not less than 10, and a fibrous filler having an average diameter of not greater than 13 μm and an average aspect ratio of not less than 5. Other fillers than those mentioned above are unsuitable, only providing a resin composition having unbalanced mechanical strength.

Of the three kinds of useful fillers, talc is particularly preferred; for it brings about further improvements in adhesion to coating and balance of mechanical strength. The term "virtually" as used for the length of talc particles is intended to means that the talc may contain those particles whose length is out of the above-specified range as long as the effects of the invention are not seriously ruined.

Talc for use in the invention can be prepared by grinding talc ore in an impact grinder or a micron grinder, pulverizing the grinds in a micron mill, a jet pulverizer, etc., followed by classification by means of a cyclone, a micron separator, etc. Talc ore from China is preferred for its low content of metallic impurities.

Mice to be used in the invention is not particularly limited in kind (commonmica, phlogopite, biotite, etc.) and process of preparation. Commonmica and phlogopite, particularly those obtained by wet grinding or wet classification are preferred.

The fibrous filler includes glass fiber, carbon fiber, aluminum borate fiber, potassium titanate fiber, basic magnesium sulfate fiber, and calcium carbonate fiber. Those having an average diameter of 0.2 to 10 μm and an average aspect ratio of 10 or greater are preferred.

The average particle size as referred to in the invention is a value obtained with a laser light scattering type particle size distribution meter. Model LA-500 manufactured by Horiba Seisakusho is a recommended meter because of its high accuracy. The diameter, length and aspect ratio of the fillers are measured under a microscope, etc.

The fillers may be surface treated with a surface active agent, a coupling agent, a metallic soap, and the like. The surface-treated fillers are effective in enhancing the improvements in adhesion to coating, mechanical strength, molding processability, appearance and dimensional stability of molded articles, and the like.

The component (c) is used in a proportion of 0.1 to 120 parts by weight, preferably 5 to 120 parts by weight, still preferably 10 to 100 parts by weight, per 100 parts by weight of the component (a). If the proportion of the component (c) is less than the above range, the resulting resin composition is insufficient in heat resistance and dimensional stability. If it exceeds the above range, the resin composition has poor appearance and poor impact strength when molded.

The modified propylene polymer as the component (d) is a modified propylene polymer having a number average molecular weight of 4,000 to 13,000 which is obtained by modifying a propylene polymer (inclusive of a propylene homopolymer and a block or random copolymer comprising propylene and a minor proportion of an α-olefin, such as ethylene) by grafting a hydroxyl-containing maleic anhydride derivative represented by formula (I) to a propylene polymer, in an amount of 5 to 20% by weight, preferably 5 to 15% by weight, based on the total component (d):

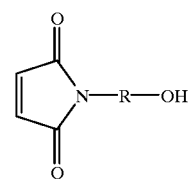

(I)

wherein R represents an alkylene group having 1 to 4 carbon atoms.

The grafting monomer is grafted to at least one terminal of the main chain of the propylene polymer and/or the main chain.

The propylene polymer to be modified preferably has a number average molecular weight of 4,000 to 10,000, particularly 5,000 to 10,000.

The manner of grafting modification is not particularly restricted. For example, the propylene polymer is thermally oxidized, followed by grafting a functional group, or grafting can be carried out while the propylene polymer is in a molten state in an extruder, etc. or in a dissolved state.

The component (d) is used in a proportion of 5 to 40% by weight, preferably 8 to 40% by weight, still preferably 8 to 35% by weight, based on the component (a). If the proportion of the component (d) is less than the above range, the resulting resin compound has poor adhesion to coating. If the proportion exceeds the above range, the resin composition has poor mechanical strength balance for practical use.

The hydroxyl-terminated diene polymer or a hydrogenation product thereof as the component (e) is not always essential to the propylene resin composition of the invention but can be used if desired.

Polyhydroxypolybutadiene can be mentioned as a typical example of the hydroxyl-terminated diene polymer. Specifically, the hydroxyl-terminated diene polymer includes polymers having at least one hydroxyl group at the terminal thereof, having a molecular weight of 200 to 100,000, preferably 500 to 50,000, still preferably 800 to 10,000, and being liquid, semisolid or solid at ambient temperature. In general, the polymer preferably contains 1 to 10, particularly 1.5 to 5, hydroxyl groups in average per molecule and has a hydroxyl value of 15 to 250, preferably 25 to 125 (KOHmg/g).

The hydroxyl-terminated diene polymer can be prepared from at least one conjugated diene, such as 1,3-diene, in a known manner, for example, radical polymerization, anionic polymerization, and the like. For example, the method disclosed in JP-A-51-71391 can be used. Where radical polymerization is followed, the polymer can be obtained with ease by polymerizing a diene monomer in the presence of hydrogen peroxide as an initiator. Where anionic polymerization is followed, a conjugated diene monomer is polymerized in the presence of a catalyst for anionic polymerization, such as an alkali metal or an organic alkali metal compound, in a usual manner to obtain a living polymer having an alkali metal at least one terminal thereof, and reacting the resulting living polymer with a monoepoxy compound, formaldehyde, acetaldehyde, acetone or a halogenoalkylene oxide, polyepoxide, etc.

Examples of useful conjugated diene monomers are 1,3-butadiene, 1,3-pentadiene, isoprene, chloroprene, 2,3-dimethyl-1,3-butadiene, and 1-phenyl-1,3-butadiene.

The hydrogenation product of a hydroxyl-terminated diene polymer as the component (e) is obtained by hydrogenating the above-mentioned hydroxyl-terminated diene polymer in a usual manner, for example, as described in JP-A-51-71391. While the hydrogenation may be conducted either partially or completely, it is usually preferable for the hydrogenation product to have an iodine value of 0 to 20, particularly 0 to 5 (g/100 g).

The hydroxyl-terminated diene polymer and a hydrogenation product thereof as the component (e) may be used either alone or a mixture of two or more of different kinds.

The component (e) may be used in a proportion of up to 10 parts by weight, preferably 0.5 to 10 parts by weight, particularly 1 to 5 parts by weight, per 100 parts by weight of the component (a). If the component (e) is not used, the resulting resin composition tends to have insufficient adhesion to coating. If the proportion of the component (e) exceeds 10 parts, the resin composition loses its practical use due to imbalanced mechanical strength.

If desired, the propylene resin composition of the invention may further contain other compounding additives or components in addition to the aforesaid components (a) to (e) in order to obtain further improvements on performance as long as the effects of the invention are not impaired. Useful additives or components include pigments for coloration, antioxidants, antistatics, lubricants, flame retarders, dispersants, light stabilizers, nucleating agents, catalysts, and various resins and fillers other than the components (a) to (e). In particular, addition of phosphorus oxyacid compounds, such as acidic phosphoric ester derivatives, is effective in further improving adhesion to some coatings. Examples of useful acidic phosphoric esters include monobutyl phosphate, mono(2-ethylhexyl) phosphate, di(2-ethylhexyl) phosphate, monoisodecyl phosphate, monolauryl phosphate, and monononylphenoxyethyl phosphate.

The propylene resin composition of the invention is obtained by compounding the components (a) to (d) and, if desired, the components (e) and/or (f) according to the compounding ratio as specified above, kneading the mixture in a usual kneading machine, such as a single-screw extruder, a twin-screw extruder, a Banbury mixer, a roll mixer, a Brabender Plastograph, a kneader, etc. The resulting compound is preferably pelletized.

The method of kneading and pelletization is preferably chosen so as to facilitate satisfactory dispersion of each component. A twin-screw extruder is of common use for kneading and pelletization. The components (a) to (d) and, if desired, the components (e) and/or (f) may be kneaded altogether or, in order to ensure improvement on performance, the component (a) and a part or the whole of the component (b) are kneaded first, and the other components are then added and kneaded, followed by pelletization.

The thus prepared propylene resin composition is molded into a variety of molded articles by various molding techniques, i.e., injection molding, press injection molding, compression molding, extrusion (sheet forming, film forming, and blown film extrusion), and the like. Injection molding, inclusive of gas injection molding, and press injection molding are preferred.

The propylene resin composition of the invention has high suitability to coating. That is, a coating, especially a melamine coating generally having poor adhesion, can be applied directly to a molded article of the propylene resin composition even with a relatively small wall thickness to a relatively small coating thickness to provide a coated article having a satisfactory appearance and well-balanced high mechanical strength. Therefore, the resin composition is useful as a molding material of various industrial parts.

In carrying out coating of a molded article of the propylene resin composition, a coating may be applied directly without any pretreatment given to the surface of the molded article. If desired, the surface to be coated can previously be cleaned with water, an alcohol, an alkali, etc. The coating layer is then baked to dry in a usual manner.

Coatings which are applicable to the molded article of the propylene resin composition of the invention include melamine coatings mainly comprising an acrylic polyol resin and a melamine crosslinking agent and urethane coatings comprising a polyester polyol resin or an acrylic polyol resin and an isocyanate crosslinking agent, with the melamine coatings being preferred. While not limiting, the coating thickness is usually 1 to 100 $\mu$m.

The propylene resin composition according to the present invention exhibits high suitability to coating. That is, a coating, especially a melamine coating generally having poor adhesion, can be applied directly to a molded article of the propylene resin composition even with a relatively small wall thickness to a relatively small coating thickness without requiring TCE pretreatment or primer coating to provide a coated article having a sufficient adhesion to coating, a satisfactory appearance and well-balanced high mechanical strength (i.e., high rigidity and high impact strength).

Therefore, the resin composition is highly promising as a molding material of various industrial parts, such as interior and exterior automotive trim (e.g., bumpers, door protectors, fender covers, instrument panels, glove compartments), housings of appliances (e.g., TV sets, VTR, washing machines, vacuum cleaners), and housings of acoustic equipment (e.g., stereo sets).

The present invention will now be illustrated in greater detail with reference to Examples, but it should be understood that the invention is not construed as being limited thereto. Unless otherwise indicated, all the percents and parts are given by weight.

[I] Material (1) Component (a) (all in the form of pellets, having incorporated therein an antioxidant):

a-1: Propylene-ethylene block copolymer having an MFR of 40 g/10 min (230° C., 2.16 kg-load, hereinafter the same) comprising 92% of a crystalline polypropylene unit (unit A) having a density of 0.9092 g/cm$^3$ and 8% of an ethylene-propylene random copolymer unit (unit B) having an ethylene content of 40% and an Mw of 650,000.

a-2: Propylene-ethylene block copolymer having an MFR of 35 g/10 min comprising 80% of a crystalline polypropylene unit (unit A) having a density of 0.9093 g/cm$^3$ and 20% of an ethylene-propylene random copolymer unit (unit B) having an ethylene content of 42% and an Mw of 310,000.

a-3: Propylene-ethylene block copolymer having an MFR of 30 gi10 min comprising 56% of a crystalline polypropylene unit (unit A) having a density of 0.9088 g/cm$^3$ and 44% of an ethylene-propylene random copolymer unit (unit B) having an ethylene content of 57% and an Mw of 270,000.

a-4: Propylene homopolymer having a density of 0.9093 g/cm$^3$ and an MFR of 40 g/10 min.

(2) Component (b) (all in the form of pellets):

b-1: Ethylene-1-octene copolymer prepared by solution polymerization using a metallocene catalyst, having a 1-octene content of 33% ($^{13}$C-NMR analysis), an MFR of 3.1 g/10 min, a density of 0.86 g/cm$^3$, and an ethylene triad sequence of 62.8%.

b-2: Ethylene-1-octene copolymer prepared by solution polymerization using a metallocene catalyst, having a 1-octene content of 28% ($^{13}$C-NMR analysis), an MFR of 1.2 g/10 min, a density of 0.86 g/cm$^3$, and an ethylene triad sequence of 63.3%.

b-3: Ethylene-1-hexene copolymer prepared by high-pressure polymerization using a metallocene catalyst, having a 1-hexene content of 31% ($^{13}$C-NMR analysis), an MFR of 2.6 g/10 min, a density of 0.87 g/cm$^3$, and an ethylene triad sequence of 67.0%.

b-4: Ethylene-1-octene copolymer prepared by solution polymerization using a metallocene catalyst, having a 1-octene content of 35% ($^{13}$C-NMR analysis), an MFR of 15.6 g/10 min, a density of 0.86 g/cM$^3$, and an ethylene triad sequence of 59.7%.

b-5: Ethylene-propylene copolymer prepared by solution polymerization using a vanadium catalyst, having a propylene content of 26% ($^{13}$C-NMR analysis), an MFR of 3.8 g/10 min, a density of 0.86 g/cm$^3$, and an ethylene triad sequence of 43.8%.

b-6: Ethylene-1-butene copolymer prepared by solution polymerization using a vanadium catalyst, having a 1-butene content of 32% ($^{13}$C-NMR analysis), an MFR of 2.2 g/10 min, a density of 0.87 g/cm$^3$, and an ethylene triad sequence of 60.1%.

b-7: Ethylene-1-butene copolymer prepared by high-pressure polymerization using a metallocene catalyst, having a 1-butene content of 18% ($^{13}$C-NMR analysis), an MFR of 2.7 g/10 min, a density of 0.89 g/cm$^3$, and an ethylene triad sequence of 70.5%.

b-8: Ethylene-1-hexene copolymer prepared by high-pressure polymerization using a metallocene catalyst, having a 1-hexene content of 68% ($^{13}$C-NMR analysis), an MFR of 2.5 g/10 min, a density of 0.86 g/cm$^3$, and an ethylene triad sequence of 34.3%.

(3) Component (c) (all in the form of powder):

c-1: Talc having a total length virtually of not more than 10 $\mu$m, an average particle size of 2.6 $\mu$m, and an average aspect ratio of 6.

c-2: Ground calcium carbonate having an average diameter of 3.3 $\mu$m and an average aspect ratio of 1.

(4) Component (d) (flaky):

d-1: Modified propylene polymer obtained by thermally oxidizing a propylene-ethylene random copolymer having an MFR of 55 g/10 min, a number average molecular weight (Mn) of 7,000, and an ethylene content of 3%; grafting a maleic anhydride group to both the terminals and the main chain in the presence of an azo type radical initiator to a proportion of 10% based on the resulting modified polymer, and modifying the introduced maleic anhydride group with ethanolamine.

(5) Component (e) (flaky):

e-1: Hydrogenation product of polyhydroxypolybutadiene having an iodine value of 1.5 (g/100 g) and a hydroxyl value of 84.8 (KOHmg/g) (a product of Mitsubishi Chemical Co., Ltd.)

[II] Evaluation (1) Adhesion to Coating (peel test):

A resin composition was molded into a plate. The plate, as untreated, was spray coated with a one-pack type organic solvent type acrylic melamine coating by means of an air spray gun to a coating thickness of about 20 $\mu$m, baked at 140° C. for 15 minutes, and allowed to stand at room temperature for 48 hours.

The baked dry film (test piece) was crosshatched by drawing 11 parallel lines at 2 mm intervals and 11 parallel lines perpendicular thereto at 2 mm intervals with using a single-edge knife to make 100 squares. A cellophane adhesive tape (JIS-Z1522) was adhered to the crosshatched film with sufficient pressure and rapidly stripped off at a peel angle of about 30°. The peel test was repeated 10 times, and the ratio of the number of squares of the film remaining on the plate after the 10th peel test to the total number of squares (100) was obtained as a peel strength (%). For those test pieces showing no peel of the film in the 10th peel test, the test was further repeated, and the number of times of repetition required until peeling of the film occurred was recorded (note: * in Tables 1 and 2).

(2) Molding Processability (flow marks):

A resin composition was injected into a sheeting mold (length: 360 mm; width: 100 mm; thickness: 2 mm; gate: pinpoint; surface: satin-embossed finish) by means of an in-line screw type injection molding machine (Toshiba IS170) under conditions of a resin temperature of 210° C., a mold temperature of 30° C., a screw revolution speed of 80 rpm, and an injection pressure of 800 kg/cm$^2$. The longitudinal distance of a flow mark (ripple type flow pattern) appearing on the molded article from the gate was measured. The longer the distance, the more satisfactory the appearance. A distance of 200 mm or longer is satisfactory in practice for large-sized molded articles, and a distance of 240 mm or longer is particularly satisfactory.

(3) Mechanical Strength:

3-1. Flexural Modulus:

Measured in accordance with JIS-K7203 at 23° C. Flexural modulus also provides a measure of heat resistance.

Molded articles having a flexural modulus of 1,200 MPa or higher are useful as various automotive parts, such as a bumper. Those having a flexural modulus of 1,500 MPa or higher are particularly useful, exhibiting excellent suitability to high-temperature coating.

3-2. Dart Drop Impact Test:

A resin composition was injection molded to prepare a test piece of 120 mm in length, 100 mm in width, and 2 mm in thickness. A dart having a diameter of 20 mm and weighing 4 kg was dropped on the test piece from a height of 2 m at −30° C., and the absorbed impact energy was measured. Molded articles having a dart drop impact strength of 5 J or higher as measured above are particularly useful as various automotive parts.

EXAMPLES 1 TO 9 AND COMPARATIVE EXAMPLES 1 TO 9

Components (a) to (e) were compounded according to the ratios shown in Tables 1 and 2 below and thoroughly mixed in a high-speed mixer. The mixture was kneaded and pelletized at 210° C. by means of Wn extruder (Model KCM manufactured by Kobe Steel, Ltd.). The pellets were fed to the above-described injection molding machine and molded into test pieces for evaluation. The results of evaluation are shown in Tables 1 and 2.

As shown in Table 1, each of the resin compositions of Examples 1 to 9 exhibited satisfactory adhesion to coating, good appearance, and well-balanced mechanical strength, whereas those of Comparative Examples 1 to 9 as shown in Table 2 proved inferior in balance of these properties.

TABLE 1

| | Propylene Resin Composition | | | | | | | | | Results of Evaluation | | | | |
|---|---|---|---|---|---|---|---|---|---|---|---|---|---|---|
| | | | | | | | | | | Adhesion to Coating | | Appearance | Mechanical Strength | |
| | Component (a) | | Component (b) | | Component (c) | | Component (d) | | Component (e) | | | Flow Mark | | Dart Impact |
| Example No. | Kind | Amount (part) | Kind | Amount (part) | Kind | Amount (part) | Kind | Amount (part) | Kind | Amount (part) | Peel Strength (10th) (%) | Number of Peel Tests* | Distance (mm) | Flexural Modulus (MPa) | Strength (J) |
| 1 | a-1 | 100 | b-1 | 44 | c-1 | 31 | d-1 | 17 | — | — | 100 | 10 | 305 | 1830 | 5.0 |
| 2 | a-1 a-2 | 74 26 | b-1 | 32 | c-1 | 18 | d-1 | 11 | — | — | 100 | 13 | 295 | 1520 | 5.2 |
| 3 | a-1 a-2 | 75 25 | b-1 | 44 | c-1 | 31 | d-1 | 17 | — | — | 100 | 18 | 280 | 1760 | 6.0 |
| 4 | a-1 a-2 | 77 23 | b-1 | 63 | c-1 | 47 | d-1 | 23 | — | — | 100 | 25 | 245 | 2030 | 6.3 |
| 5 | a-1 a-2 | 43 57 | b-1 | 71 | c-1 | 86 | d-1 | 29 | — | — | 100 | 31 | 205 | 2320 | 5.0 |
| 6 | a-1 a-2 | 75 25 | b-2 | 44 | c-1 | 31 | d-1 | 17 | — | — | 100 | 15 | 250 | 1740 | 6.4 |
| 7 | a-1 a-2 | 75 25 | b-3 | 44 | c-1 | 31 | d-1 | 17 | — | — | 100 | 14 | 245 | 1790 | 5.3 |
| 8 | a-1 a-2 | 75 25 | b-4 | 44 | c-1 | 31 | d-1 | 17 | — | — | 100 | 23 | 310 | 1760 | 5.3 |
| 9 | a-1 a-2 | 74 26 | b-1 | 44 | c-1 | 31 | d-1 | 17 | e-1 | 2 | 100 | 21 | 260 | 1700 | 5.8 |

TABLE 2

| | Propylene Resin Composition | | | | | | | | | Results of Evaluation | | | | |
|---|---|---|---|---|---|---|---|---|---|---|---|---|---|---|
| | | | | | | | | | | Adhesion to Coating | | Appearance | Mechanical Strength | |
| Compara. | Component (a) | | Component (b) | | Component (c) | | Component (d) | | Component (e) | | | Flow Mark | | Dart Impact |
| Example No. | Kind | Amount (part) | Kind | Amount (part) | Kind | Amount (part) | Kind | Amount (part) | Kind | Amount (part) | Peel Strength (10th) (%) | Number of Peel Tests* | Distance (mm) | Flexural Modulus (MPa) | Strength (J) |
| 1 | a-1 a-2 | 74 26 | b-1 | 38 | c-1 | 26 | — | — | — | — | 0 | — | — | — | — |
| 2 | a-1 a-2 | 75 25 | b-1 | 39 | c-1 | 27 | d-1 | 3 | — | — | 3 | — | — | — | — |
| 3 | a-3 | 100 | b-1 | 44 | c-1 | 31 | d-1 | 17 | — | — | 100 | 20 | 150 | 1330 | 6.5 |
| 4 | a-4 | 100 | b-1 | 44 | c-1 | 31 | d-1 | 17 | — | — | 78 | — | 245 | 1880 | 2.2 |
| 5 | a-1 a-2 | 75 25 | b-5 | 44 | c-1 | 31 | d-1 | 17 | — | — | 31 | — | — | — | — |
| 6 | a-1 a-2 | 75 25 | b-6 | 44 | c-1 | 31 | d-1 | 17 | — | — | 92 | — | 230 | 1590 | 5.5 |
| 7 | a-1 a-2 | 75 25 | b-7 | 44 | c-1 | 31 | d-1 | 17 | — | — | 69 | — | — | 1680 | 4.2 |

TABLE 2-continued

| | Propylene Resin Composition | | | | | | | | | | Results of Evaluation | | | | |
| | | | | | | | | | | | Adhesion to Coating | | Appearance | Mechanical Strength | |
| | Component (a) | | Component (b) | | Component (c) | | Component (d) | | Component (e) | | Peel Strength | Number | Flow Mark | Flexural | Dart Impact |
| Compara. Example No. | Kind | Amount (part) | Kind | Amount (part) | Kind | Amount (part) | Kind | Amount (part) | Kind | Amount (part) | (10th) (%) | of Peel Tests* | Distance (mm) | Modulus (MPa) | Strength (J) |
|---|---|---|---|---|---|---|---|---|---|---|---|---|---|---|---|
| 8 | a-1 a-2 | 75 25 | b-8 | 44 | c-1 | 31 | d-1 | 17 | — | — | 100 | 11 | 190 | 1320 | 6.1 |
| 9 | a-1 a-2 | 75 25 | b-1 | 44 | c-2 | 31 | d-1 | 17 | — | — | 100 | 9 | 225 | 970 | 4.1 |

While the invention has been described in detail and with reference to specific examples thereof, it will be apparent to one skilled in the art that various changes and modifications can be made therein without departing from the spirit and scope thereof.

What is claimed is:

1. A propylene resin composition comprising the components of:

(a) 100 parts by weight of a material obtained by sequential polymerization of propylene followed by polymerization of a mixture of propylene and ethylene, comprising 60 to 95% by weight of a crystalline polypropylene unit as a unit A and 5 to 40% by weight of an ethylene-propylene random copolymer unit as a unit B;

(b) 2 to 120 parts by weight of an ethylene-1-octene copolymer obtained by polymerization in the presence of a metallocene catalyst, wherein the ethylene-1-octene copolymer has a 1-octene content of 20 to 55% by weight, and a melt flow rate measured at 230° C., 2.16 kg-load, of 0.5 to 40 g/10 min and a density of 0.85 to 0.88 g/cm$^3$.

(c) 0.1 to 120 parts by weight of at least one filler selected from the group consisting of talc having a total length virtually of not greater than 15 μm, an average particle size of 1.5 to 6 μm, and an average aspect ratio of not less than 5; mica having an average particle size of 8 to 100 μm and an average aspect ratio of not less than 10; and a fibrous filler having an average diameter of not greater than 13 μm and an average aspect ratio of not less than 5; wherein said average particle size is determined by laser light scattering and said average aspect ratio is measured by microscopy;

(d) 5 to 40 parts by weight of a modified propylene polymer having a number average molecular weight of 4,000 to 13,000, wherein the modified propylene polymer is modified by grafting a maleic anhydride derivative represented by formula (I) to a propylene polymer, the amount of the maleic anhydride derivative being 5 to 20% by weight based on the component (d);

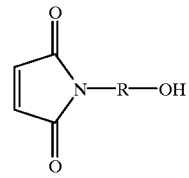

(I)

wherein R represents an alkylene group having 1 to 4 carbon atoms; and (e) 0 to 10% by weight of a hydroxyl-terminated diene polymer or a hydrogenation product thereof.

2. A propylene resin composition according to claim 1, wherein the component (c) is talc having a total length virtually of not greater than 15 μm, an average particle size of 1.5 to 6 μm, and an average aspect ratio of not less than 10.

* * * * *